United States Patent
Kumar et al.

[11] Patent Number: 6,132,905
[45] Date of Patent: Oct. 17, 2000

[54] SOLID COMPOSITE ELECTROLYTES FOR LITHIUM BATTERIES

[75] Inventors: Binod Kumar, Dayton; Lawrence G. Scanlon, Jr., Fairborn, both of Ohio

[73] Assignee: The University of Dayton, Dayton, Ohio

[21] Appl. No.: 09/136,640

[22] Filed: Aug. 19, 1998

Related U.S. Application Data

[60] Provisional application No. 60/056,465, Aug. 21, 1997.

[51] Int. Cl.$^7$ ....................................................... H01M 6/18
[52] U.S. Cl. .......................... 429/322; 252/62.2; 428/325
[58] Field of Search .......................... 252/62.2; 428/327, 428/325; 429/304, 306, 320, 322, 323

[56] References Cited

U.S. PATENT DOCUMENTS

| | | |
|---|---|---|
| 4,049,881 | 9/1977 | Rao et al. . |
| 5,314,765 | 5/1994 | Bates . |
| 5,576,115 | 11/1996 | Capuano et al. . |
| 5,695,873 | 12/1997 | Kumar et al. . |
| 5,728,489 | 12/1996 | Gao et al. . |

OTHER PUBLICATIONS

Phipps et al. (Solid States Ionics 5 (1981) 393–396)., No month available, 1981.
Krawiec et al. (Journal of Power Sources 54 (1995) 310–315)., No month available, 1995.
Skaarup et al., "Mixed Phase Solid Electrolytes", *Solid State Ionics*, 28–30 (1988) pp. 975–978, No month available.
Capuano et al., "Composite Polymer Electrolytes", *J. Electrochem. Soc.*, vol. 138, No. 7, Jul. 1991.

*Primary Examiner*—Maria Nuzzolillo
*Assistant Examiner*—Susy Tsang
*Attorney, Agent, or Firm*—Killworth, Gottman, Hagan & Schaeff, LLP

[57] ABSTRACT

Solid composite electrolytes are provided for use in lithium batteries which exhibit moderate to high ionic conductivity at ambient temperatures and low activation energies. In one embodiment, a ceramic-ceramic composite electrolyte is provided containing lithium nitride and lithium phosphate. The ceramic-ceramic composite is also preferably annealed and exhibits an activation energy of about 0.1 eV.

7 Claims, 2 Drawing Sheets

Conductivity vs. 1000/T plots of (A) 10 $Li_3N$:1 $LiPO_3$ material annealed at 100°C for 48 hrs;
(B) 10 $Li_3N$:2 $LiPO_3$ material annealed at 100°C for 17 hrs;
(C) 10 $Li_3N$:3 $LiPO_3$ material annealed at 100°C for 17 hrs;
(D) 10 $Li_3N$:5 $LiPO_3$ material annealed at 100°C for 90 hrs.

Conductivity vs. temperature of PEO:LiBF$_4$-TiO$_2$(20%) material annealed at various conditions.

SOLID COMPOSITE ELECTROLYTES FOR LITHIUM BATTERIES

CROSS REFERENCE TO RELATED APPLICATIONS

This application claims the benefit of U.S. provisional application Ser. No. 60/056,465, filed Aug. 21, 1997.

GOVERNMENT RIGHTS

The Government has rights in this invention pursuant to Contract No. F33615-93-C-2350 awarded by the United States Air Force Department of Energy.

BACKGROUND OF THE INVENTION

The present invention relates to solid composite electrolytes for use in rechargeable lithium batteries, and more particularly, to a polymer-ceramic composite and ceramic-ceramic composite which exhibit enhanced low-temperature ionic conductivity and low temperature dependence of conductivity.

Widespread interest has existed in the use of solid electrolytes for use in lithium batteries and other high-energy-density power sources. Various classes of materials have been proposed for use including polymers, ceramics, and polymer-ceramic composites, particularly polymer electrolytes. Solid polymer electrolytes generally consist of a high molecular weight polymer such as polyethylene oxide complexed with a lithium salt. However, the conductivity of such electrolytes has been marginal for low (ambient) temperature applications. In addition, such electrolytes possess a low cationic transport number, they exhibit poor interfacial stability with lithium electrodes, and they have a very high activation energy (high temperature dependence) for lithium ion conduction at low temperatures.

Polymer-ceramic composite electrolytes are a known subclass of solid polymer electrolytes which are formed by incorporating a ceramic material in the polymer matrix to enhance conductivity. For example, ceramic additives such as $Al_2O_3$, $LiAlO_2$, $SiO_2$, and zeolite have been used in small amounts to increase the room temperature conductivity of composite electrolytes. See Capuano et al. "Composite Polymer Electrolytes", *J. Electrochem. Soc.* 138, 1918 (1991) which teaches the incorporation of $\gamma$-$Al_2O_3$ and $LiAlO_2$ in a poly(ethylene oxide) polymer.

The use of lithium nitride ($Li_3N$) has also been proposed for use in composites as it has an high ionic conductivity at ambient temperatures of the order of about $10^{-3}$ S cm$^{-1}$. See Skaarup et al. "Mixed Phase Solid Electrolytes", *Solid State Ionics*, 28–30, 975 (1988), which teaches a polymer composite containing $Li_3N$. See also commonly assigned U.S. Pat. No. 5,695,873, which teaches a polymer-ceramic composite electrolyte containing lithium nitride. However, while the incorporation of ceramic materials in composite electrolytes results in increased conductivity as compared with solid polymer electrolytes, up until now such increases have been relatively marginal, even when such electrolytes have been subjected to low temperature annealing. In addition, the processing of such polymer-ceramic composite electrolytes in thin film applications has been limited due to the relatively large volume fraction of lithium nitride used as well as the brittleness of lithium nitride.

Accordingly, there is still a need in the art for a solid composite electrolyte for use in lithium batteries and other electrochemical applications which may be easily manufactured and which exhibits high conductivity at ambient temperatures and low temperature dependence of conductivity.

SUMMARY OF THE INVENTION

The present invention meets those needs by providing solid composite electrolytes which exhibit moderate to high conductivity at ambient temperature and low activation energies for lithium transport, i.e., low temperature dependence of conductivity. The solid composite electrolytes may be used in a variety of electrochemical applications, particularly lithium rechargeable batteries.

According to one aspect of the present invention, a solid composite electrolyte is provided comprising at least one lithium-containing phase and having an activation energy from about 0.10 eV to about 0.50 eV. By activation energy, it is meant the energy needed for transport of lithium ions through the composite electrolyte. In one embodiment of the invention, the solid composite electrolyte is a polymer-ceramic composite electrolyte having an activation energy of about 0.5 eV and comprising from about 30 to 70% by weight poly(ethylene oxide) (PEO), from about 10 to 20% by weight lithium tetrafluoroborate ($LiBF_4$), and from about 5 to 40% by weight titanium dioxide ($TiO_2$). Preferably, the titanium dioxide is in the form of a powder having a particle size of about 5 to 30 nm, and more preferably, about 17 nm.

In a preferred embodiment of the invention, the polymer-ceramic composite electrolyte preferably comprises about 60% by weight poly(ethylene oxide), about 10% by weight lithium tetrafluoroborate, and about 30% by weight titanium dioxide.

In an alternative embodiment of the invention, the polymer-ceramic composite electrolyte comprises from about 30 to 70% by weight poly(ethylene oxide), from about 10 to 20% by weight lithium tetrafluoroborate, and from about 5 to 40% by weight of a ceramic material selected from the group consisting of MgO, ZnO, SrO, BaO, CaO, $ZrO_2$, $Al_2O_3$, $SiO_2$, SiC, $Si_3N_4$, and BN.

Preferably, the polymer-ceramic composite electrolyte of the present invention is in the form of a thin film which has been annealed such that the film has a room temperature conductivity of the order of about $10^{-5}$ S cm$^{-1}$ to $10^{-3}$ S cm$^{-1}$. By room temperature conductivity, it is meant that the film exhibits high conductivity at temperatures ranging from about $-40°$ to $40°$ C. The film is preferably about 100 $\mu$m thick.

In another embodiment of the invention, the solid composite electrolyte comprises at least one lithium-containing phase and a phase containing a ceramic material selected from the group consisting of MgO, ZnO, SrO, BaO, CaO, $ZrO_2$, $Al_2O_3$, $SiO_2$, SiC, $Si_3N_4$, and BN.

In an alternative embodiment of the invention, the solid composite electrolyte is a ceramic-ceramic composite electrolyte which comprises from about 40 to 90% by weight lithium nitride and from about 10 to 60% by weight lithium phosphate. More preferably, the ceramic-ceramic composite electrolyte comprises about 60% lithium nitride and about 40% lithium phosphate.

The ceramic-ceramic composite electrolyte is preferably in the form of a compressed disc which is from about 0.05 to 0.1 cm thick. The compressed disc has preferably been annealed such that it exhibits a room temperature conductivity of the order of about $10^{-6}$ S cm$^{-1}$ to about $10^{-7}$ S cm$^{-1}$. The ceramic-ceramic composite electrolyte exhibits a very low activation energy of 0.1 eV.

The solid composite electrolytes of the present invention have been found to exhibit excellent electrode-electrolyte interfacial stability, and because they exhibit low activation energies, they may be effectively used in batteries and other electrochemical devices operating at low temperatures.

Accordingly, it is a feature of the present invention to provide solid composite electrolytes for use in lithium batteries having enhanced low-temperature ionic conductivity and low activation energies. This, and other features and advantages of the present invention will become apparent from the following detailed description, the accompanying drawings, and the appended claims.

DETAILED DESCRIPTION OF THE PREFERRED EMBODIMENT

Figure 1:
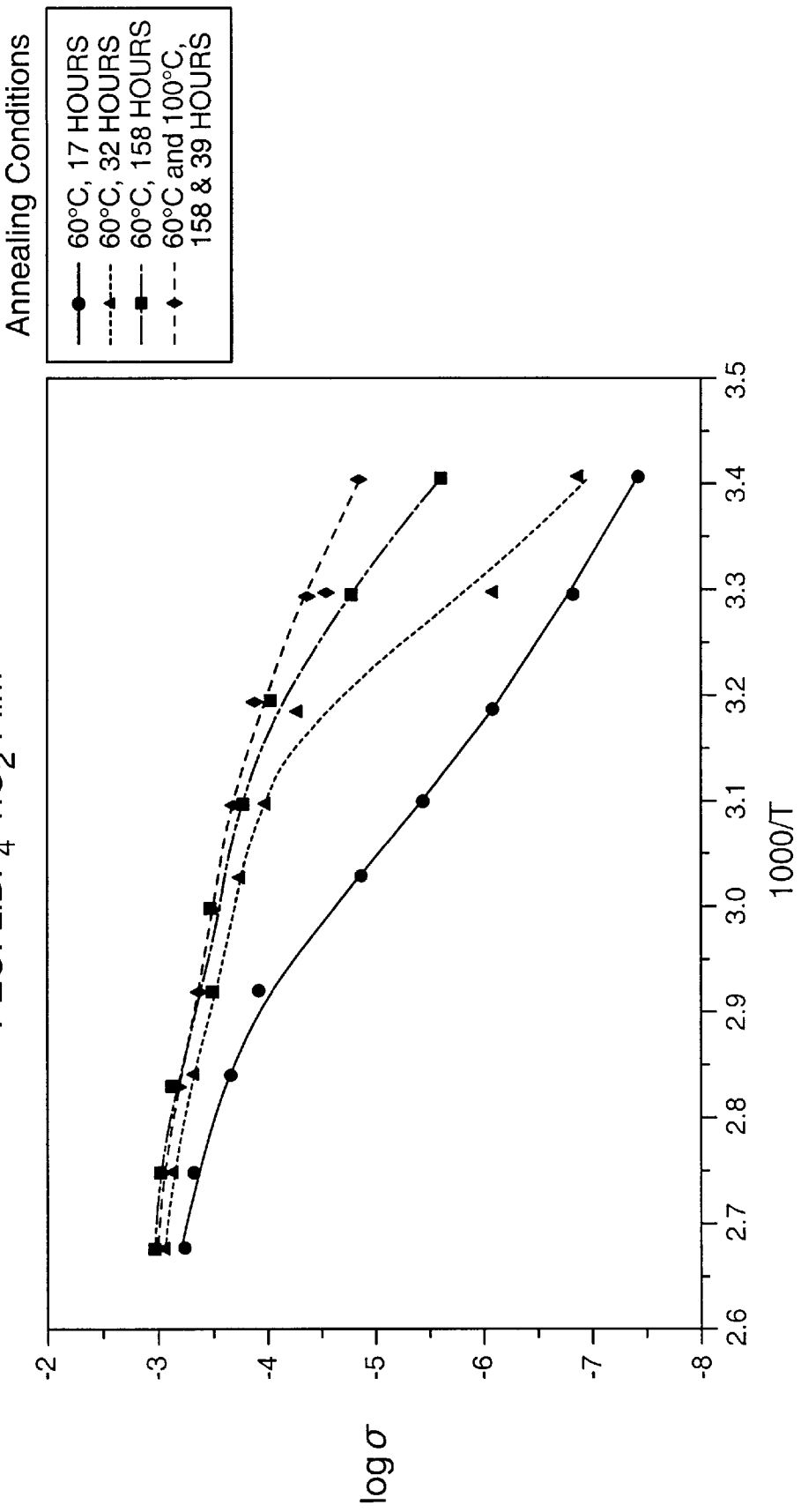
FIG. 1 is a graph illustrating the temperature dependence of conductivity for the polymeric-ceramic composite electrolyte annealed film of the present invention containing 20% by weight titanium dioxide.

The solid composite electrolytes of the present invention provide many advantages over previously used solid electrolytes. In the case of the polymer-ceramic composite electrolyte, the use of a ceramic material such as titanium dioxide provides enhanced low-temperature conductivity while the polymer component allows the electrolyte to be fabricated into a thin film for use in batteries and other devices. Because the titanium dioxide is provided in the form of a powder having nanoscale-sized particles, it is believed that the high surface area of the dispersed particles helps promote conductivity and improve mechanical stability. In addition, the conductivity of the resulting film is significantly increased by annealing the film as the annealing step is believed to facilitate lithium ion transport while maintaining a relatively low activation energy.

The ceramic-ceramic composite electrolyte of the present invention is also advantageous in that it exhibits a very low activation energy of about 0.1 eV, which is believed to be due to the annealing step which facilitates interfacial lithium ion transport between $Li_3N$ and $LiPO_3$.

Both the polymer-ceramic and ceramic-ceramic composite electrolytes exhibit improved lithium electrolyte interfacial stability and possess high cationic transport numbers approaching unity, and thus may be used effectively in commercial rechargeable lithium batteries.

In the polymer-ceramic composite electrolyte, the polymer component, poly(ethylene oxide), preferably comprises from about 30% to 70% by weight of the composite and is available from Aldrich Chemical, for example. Lithium tetrafluoroborate, which preferably comprises from about 10 to 20% by weight of the composite, is also available from Aldrich Chemical. Preferably, the ratio of oxygen to lithium in the poly(ethylene oxide) and lithium tetrafluoroborate complex is maintained at about 8:1. The titanium dioxide preferably comprises from about 5 to 40% by weight of the composite, and is in the form of a powder having a particle size of about 17 nm which is available from Degussa Chemical.

The polymer-ceramic composite electrolyte is preferably made using reagent grade poly(ethylene oxide) (PEO) and lithium tetrafluoroborate ($LiBF_4$). A solution of PEO and $LiBF_4$ is prepared in analytical grade acetonitrile. The nanosize titanium dioxide is dispersed in the solution, preferably using a sonicator. The homogenized solution is then cast onto a Teflon® block into thin films, which are subsequently dried to obtain films of about 100 $\mu$m in thickness.

The film is then annealed to enhance conductivity. We have found that annealing the film at a temperature of from 60° to 100° C. for periods ranging from 12 to 72 hours results in a significant increase in conductivity. It should be appreciated that the aforementioned annealing temperatures and times may be varied so as to optimize the resulting conductivity. Factors that affect annealing conditions include the melting point of poly(ethylene oxide) (68° C.), the volume fraction of titanium dioxide, and the thickness of the electrolyte film. After annealing, the polymer-ceramic composite electrolyte film has a room temperature conductivity of the order of about $10^{-5}$ S cm$^{-1}$ to $10^{-3}$ S cm$^{-1}$.

In the ceramic-ceramic composite electrolyte of the present invention, lithium nitride preferably comprises from about 45 to 90% by weight of the composite and is available from Alfa Aesar. Lithium phosphate comprises from about 10 to 55% by weight of the composite and is available from Johnson Matthey. In the process of making the ceramic-ceramic composite electrolyte, the lithium nitride and lithium phosphate are mixed using a mortar and pestle and then pressed in a hydraulic press to forms discs of approximately 0.05 cm to 0.1 cm in thickness. The discs are then annealed at temperatures ranging from 100° C. to 200° C.

While the solid composite electrolytes of the present invention are primarily adapted for use in lithium batteries, they may also be used in other applications such as electrochemical sensors and electrochromic devices which require fast ionic transport.

In order that the invention may be more readily understood, reference is made to the following examples, which are intended to be illustrative of the invention, but are not intended to be limiting in scope.

EXAMPLE 1

A PEO:$LiBF_4$—$TiO_2$ electrolyte was prepared in accordance with the present invention by dispersing 17 nm $TiO_2$ in a solution of PEO:$LiBF_4$ complex and acetonitrile which was subsequently cast and dried to obtain films of about 100 $\mu$m in thickness. Electrochemical measurements were carried out using EG&G impedance spectrometer Model 36B in the frequency range of 0.1 Hz to 100 kHz on cells using blocking and non-blocking electrodes. During the electrochemical measurements specimens were either held in the dry box or an evacuated, controlled atmosphere glass vessel which was heated in a temperature bath to the set temperature maintained within ±1° C.

FIG. 1 illustrates the conductivity data of the PEO:$LiBF_4$—$TiO_2$ electrolyte. As can be seen, the room temperature conductivity increased greatly upon annealing. This enhancement in conductivity was accompanied by a reduction in the activation energy, or temperature dependence of conductivity, for lithium ion transport. The activation energy averaged about 0.5 eV.

EXAMPLE 2

A ceramic-ceramic composite electrolyte in accordance with the present invention was prepared using reagent grade lithium nitride and lithium phosphate. The molar composition, atomic percent lithium, theoretical density, and lithium ion concentration per unit volume of the formulated compositions is shown in Table 1 below.

TABLE 1

| Specimen No. | Composition | Atom % Li | Theoretical Density (gm/cm$^3$) | [Li] (#/cm$^3$) |
|---|---|---|---|---|
| 1 | Li$_3$N | 75 | 1.38 | 7.17 × 10$^{22}$ |
| 2 | 10 Li$_3$N:1 LiPO$_3$ | 69 | 1.48 | 6.38 × 10$^{22}$ |
| 3 | 10 Li$_3$N:2 LiPO$_3$ | 64 | 1.56 | 5.79 × 10$^{22}$ |
| 4 | 10 Li$_3$N:3 LiPO$_3$ | 60 | 1.63 | 5.35 × 10$^{22}$ |
| 5 | 10 Li$_3$N:4 LiPO$_3$ | 57 | 1.69 | 5.01 × 10$^{22}$ |
| 6 | 10 Li$_3$N:5 LiPO$_3$ | 54 | 1.74 | 4.72 × 10$^{22}$ |

The components were weighed and mixed using a mortar and pestle in a dry box. The mixed batches were pressed in a Carver hydraulic press and discs of approximately 1.0 cm in diameter and 0.05 to 0.1 cm thick were obtained.

Figure 2:
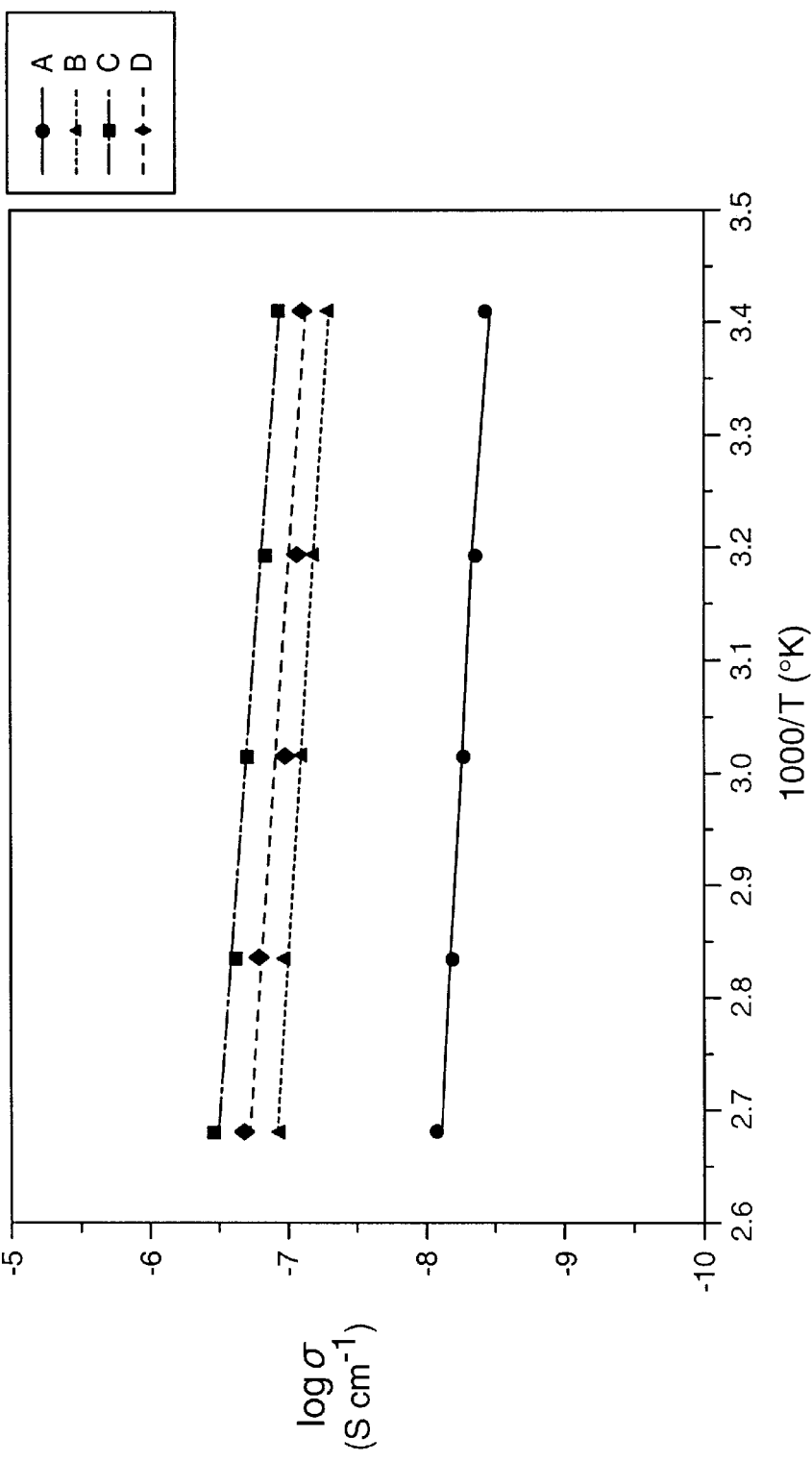
FIG. 2 is a graph illustrating the temperature dependence of conductivity for various ceramic-ceramic composite electrolyte annealed specimens.

The lithium ion conductivity data of annealed specimens with various stoichiometry are shown in FIG. 2. As the concentration of LiPO$_3$ was increased, an enhancement in conductivity over the entire temperature range (0 to 100° C.) was noted until the composition approached 10 Li$_3$N:3LiPO$_3$ stoichiometry. From FIG. 2, it can be seen that the temperature dependence of conductivity of all compositions is low.

It was found that specimen 4 (Li$_3$N:3LiPO$_3$) exhibited the highest conductivity, 10$^{-6}$ S cm$^{-1}$ to 10$^{-7}$ S cm$^{-1}$ after being annealed at 100° C. for 16.5 hours. The activation energy was calculated from the temperature dependence data to be about 0.12 eV.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A ceramic-ceramic composite electrolyte consisting of from about 45 to 90% lithium nitride and from about 10 to 55% lithium phosphate.

2. A ceramic-ceramic composite electrolyte as claimed in claim 1 consisting of about 60% lithium nitride and about 40% lithium phosphate.

3. A ceramic-ceramic composite electrolyte as claimed in claim 1 in which said composite electrolyte is in the form of a compressed disc.

4. A ceramic-ceramic composite electrolyte of claim 3 in which said disc has been annealed.

5. The ceramic-ceramic composite electrolyte of claim 4 in which said annealed disc has a room temperature conductivity of the order of about 10$^{-6}$ S cm$^{-1}$ to about 10$^{-7}$ S cm$^{-1}$.

6. The ceramic-ceramic composite electrolyte of claim 3 in which said disc is from about 0.05 to 0.1 cm thick.

7. A lithium rechargeable battery containing the ceramic-ceramic composite electrolyte of claim 1.

* * * * *